(12) United States Patent
Patil

(10) Patent No.: US 10,389,681 B2
(45) Date of Patent: Aug. 20, 2019

(54) AUTO DISCOVERY OF NETWORK ELEMENTS BY DEFINING NEW EXTENSION IN DHCP OPTIONS FOR MANAGEMENT SERVER IP ADDRESSES

(71) Applicant: Dell Products L.P., Round Rock, TX (US)

(72) Inventor: Vishwanath S. Patil, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 279 days.

(21) Appl. No.: 15/600,653

(22) Filed: May 19, 2017

(65) Prior Publication Data

US 2018/0337884 A1 Nov. 22, 2018

(51) Int. Cl.
*G06F 15/177* (2006.01)
*H04L 29/12* (2006.01)
*H04L 12/24* (2006.01)
*H04L 29/08* (2006.01)

(52) U.S. Cl.
CPC ...... *H04L 61/2015* (2013.01); *H04L 41/5058* (2013.01); *H04L 41/0806* (2013.01); *H04L 41/12* (2013.01); *H04L 67/2842* (2013.01)

(58) Field of Classification Search
CPC .................. H04L 61/2015; H04L 41/0806
See application file for complete search history.

(56) References Cited

U.S. PATENT DOCUMENTS

| | | | | |
|---|---|---|---|---|
| 2003/0005100 A1* | 1/2003 | Barnard | ............ | H04L 29/12113 709/223 |
| 2006/0161663 A1* | 7/2006 | Palm | ...................... | H04L 47/15 709/227 |
| 2010/0046729 A1* | 2/2010 | Bifano | ............... | H04M 3/42178 379/201.12 |
| 2010/0107223 A1* | 4/2010 | Zheng | .................. | H04L 61/2015 726/3 |
| 2012/0124242 A1* | 5/2012 | Chen | ................... | H04L 43/0817 709/250 |
| 2013/0262637 A1* | 10/2013 | Weaver | ............. | H04L 29/12066 709/220 |
| 2014/0068720 A1* | 3/2014 | Somers | ............... | H04L 63/1441 726/4 |
| 2015/0358233 A1* | 12/2015 | Wang | ..................... | H04L 45/02 370/392 |
| 2016/0248729 A1* | 8/2016 | Cui | ..................... | H04L 61/2015 |

* cited by examiner

*Primary Examiner* — Hieu T Hoang
(74) *Attorney, Agent, or Firm* — Jackson Walker L.L.P.

(57) ABSTRACT

An information handling resource includes a DHCP client that sends a DHCP DISCOVER message to a DHCP server. The DISCOVER message includes an option code for a management server parameter identifying management servers included in the managed network. A DHCP server sends a DHCP OFFER that indicates the management server(s). Using the management server identifiers provided by the DHCP server, the resource sends discovery NOTIFY messages to each of the management servers. The DHCP OFFER may include an IP address for each management server. The DHCP server may include or obtain the IP address of each management server from a management server attribute in a DHCP configuration file stored on or accessible to the DHCP server. Each discovery NOTIFY message may include an IP address of the managed network resource. Each of the discovery NOTIFY messages may include an unique hardware identifier of the managed network resource.

20 Claims, 5 Drawing Sheets

```
416─┐
    shared-network name {
        option domain-search "test.dell.com";
        option domain-name-servers 9.7.10.15,9.7.10.16, 9.7.10.18;
        option routers 192.168.0.254;
502─┤ ┌option management-servers 192.168.1.10, 192.168.1.11;
504─┘      
        #more parameters, e.g., shared-network      506-1
        subnet 192.168.1.0 netmask 255.255.252.0 {        506-2
            #parameters for subnet
            range 192.168.1.1 192.168.1.254;
        }
        subnet 192.168.2.0 netmask 255.255.252.0 {
            #parameters for subnet
            range 192.168.2.1 192.168.2.254;
        }
    }
```

```
   0                   1                   2                   3
   0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
 0 |    op (1)     |   htype (1)   |   hlen (1)    |   hops (1)    |
   +---------------+---------------+---------------+---------------+
 4 |                            xid (4)                            |
   +-------------------------------+-------------------------------+
 8 |           secs (2)            |           flags (2)           |
   +-------------------------------+-------------------------------+
12 |                          ciaddr  (4)                          |
   +---------------------------------------------------------------+
16 |                          yiaddr  (4)                          |
   +---------------------------------------------------------------+
20 |                          siaddr  (4)                          |
   +---------------------------------------------------------------+
24 |                          giaddr  (4)                          |
   +---------------------------------------------------------------+
28 |                          chaddr  (16)                         |
   |                                                               |
   +---------------------------------------------------------------+
44 |                          sname   (64)                         |
   |                                                               |
   |                                                               |
   +---------------------------------------------------------------+
108|                          file    (128)                        |
   |                                                               |
   |                                                               |
   |- - - - - - - - - - - - - - - - - - - - - - - - - - - - - - - |
232|  (Octet 232)  |  (Octet 233)  |  (Octet 234)  |  (Octet 235)  |
   +---------------------------------------------------------------+
```

AUTO DISCOVERY OF NETWORK ELEMENTS BY DEFINING NEW EXTENSION IN DHCP OPTIONS FOR MANAGEMENT SERVER IP ADDRESSES

TECHNICAL FIELD

The present disclosure generally relates to information handling system networks and, more particularly, management of information handlings systems.

BACKGROUND

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling system's may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, an information handling system may include a variety of hardware and software components that may be configured to process, store, and communicate information and may include one or more computer systems, data storage systems, and networking systems.

When a managed network resource, e.g., a server, chassis, network switch, or the like is added to a data center or other managed infrastructure, management servers will discover the information handling resources based on administrator-provided configuration information, e.g., IP address/host name, by sending a request for device identification using any of several methods including, as examples, simple network management protocol (SNMP): issuing a GET sysObjectId command to administratively-configured IP addresses or host names; Windows Server (WS): Sending WS identify commands to administrator-configured IP addresses or host names; proprietary queries via vendor-provided interfaces to administrator-configured IP addresses or host names.

Each of these discovery methods undesirably require administrator-provided configuration activity. For example, an administrator may be required to assign an IP address or host name to each newly introduced element. The administrator may then have to reproduce this effort to associate the newly introduced element with a management console and/or another management resource before manually triggering a manual discovery. In a large data center or a similar environment, this effort may be required so frequently as to negatively impact the administrator's ability to perform other needed functions and roles.

SUMMARY

Disclosed subject matter improves/addresses inefficiencies in discovering and provisioning newly added resource within a network. An information handling resource, also sometimes referred to herein as a managed network resource, includes a dynamic host configuration protocol (DHCP) client that supports an extension of DHCP and an auto discovery agent that sends discovery NOTIFY messages to management servers.

In accordance with disclosed subject matter, a DHCP client of a managed network resource sends a DHCP DISCOVER message to a DHCP server in the managed network. The DHCP DISCOVER message includes an option code corresponding to a management server parameter. The management server parameter is associated with and/or indicative of one or more management servers included in the managed network. A DHCP OFFER message received from a DHCP server of the managed network includes management server information indicative of the one or more management servers included in the managed network. The managed network resource may send discovery NOTIFY messages to each of the one or more management servers. Each discovery NOTIFY message may identify the managed network resource.

The DHCP OFFER message may indicate an IP address of each of the one or more management servers. The DHCP SERVER includes or obtains the IP addresses of each of the one or more management servers from one or more values of a management server attribute in a DHCP configuration file accessible to the DHCP server. The DHCP client may store the one or more IP addresses of the management servers in a cache of the DHCP client. Each discovery NOTIFY message may include an IP address of the managed network resource. Each of the discovery NOTIFY messages may include a unique hardware identifier of the managed network resource. The unique hardware identifier may be selected from a media access control address, a serial number, a tag number, and the like.

The manager network resource may monitor for receipt of a discovery acknowledgement from each of the one or more management servers. Discovery NOTIFY messages may then be re-sent to any management server that has not acknowledged within a particular interface. The DHCP client and the DHCP server may be configured to associate the manager service parameter with a particular DHCP option code. The method may include obtaining from an Internet assigned number authority a designation of a particular DHCP option code as the management server option code value for the management server option code. Sending DHCP DISCOVER message comprises automatically sending the DHCP DISCOVER automatically responsive to coupling the managed network resource to the managed network.

When a new information handling resource is plugged into or otherwise introduced into a data center or a similar environment, a DHCP client resident on the information handling resource, e.g., a network interface controller (NIC), performs a DHCP discovery sequence that includes sending a request referred to herein as a management server request. The DHCP server provides the IP addresses of all resources configured as management server resource, along with other configuration information including, subnet mask information, name server information, time server etc. as part of a DHCP offer. Upon receiving the management server IP addresses, the DHCP client stores the addresses in a cache memory or another suitable storage resource.

An auto discovery agent on the information handling resource may be configured to read the management server addresses from the cache or other storage resource and send a discovery NOTIFY to each management server IP address. The discovery agent may be configured to re-send a discovery NOTIFY, whether periodically, at each boot, or both to any management server that has not returned a discovery acknowledgement.

Each discovery NOTIFY may identify the information handling resource and add it to an inventory of discovered information handling resources inventory before sending the discovery acknowledgement back to the information handling resource.

Disclosed features beneficially facilitate discover of bare metal server discovery without requiring OS-specific or vendor-specific remote access agents. In addition, the solution will remove multiple manual steps in the current discovery process for large scale data center and helps rapid data center provisioning and monitoring of infrastructure. Disclosed solutions can be adopted to any network enabled device in managed infrastructure.

The above summary is not intended as a comprehensive description of the claimed subject matter but, rather, is intended to provide an overview of the applicable subject matter. Other methods, systems, software, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 7 illustrates a front end of a DHCP message.

DETAILED DESCRIPTION

In the following detailed description of exemplary embodiments, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "at least one embodiment", or "some embodiments" and the like indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not for other embodiments.

It is understood that the use of specific component, device, and/or parameter names and/or corresponding acronyms thereof, such as those of the executing utility, logic, and/or firmware (F/W) described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Figure 1:
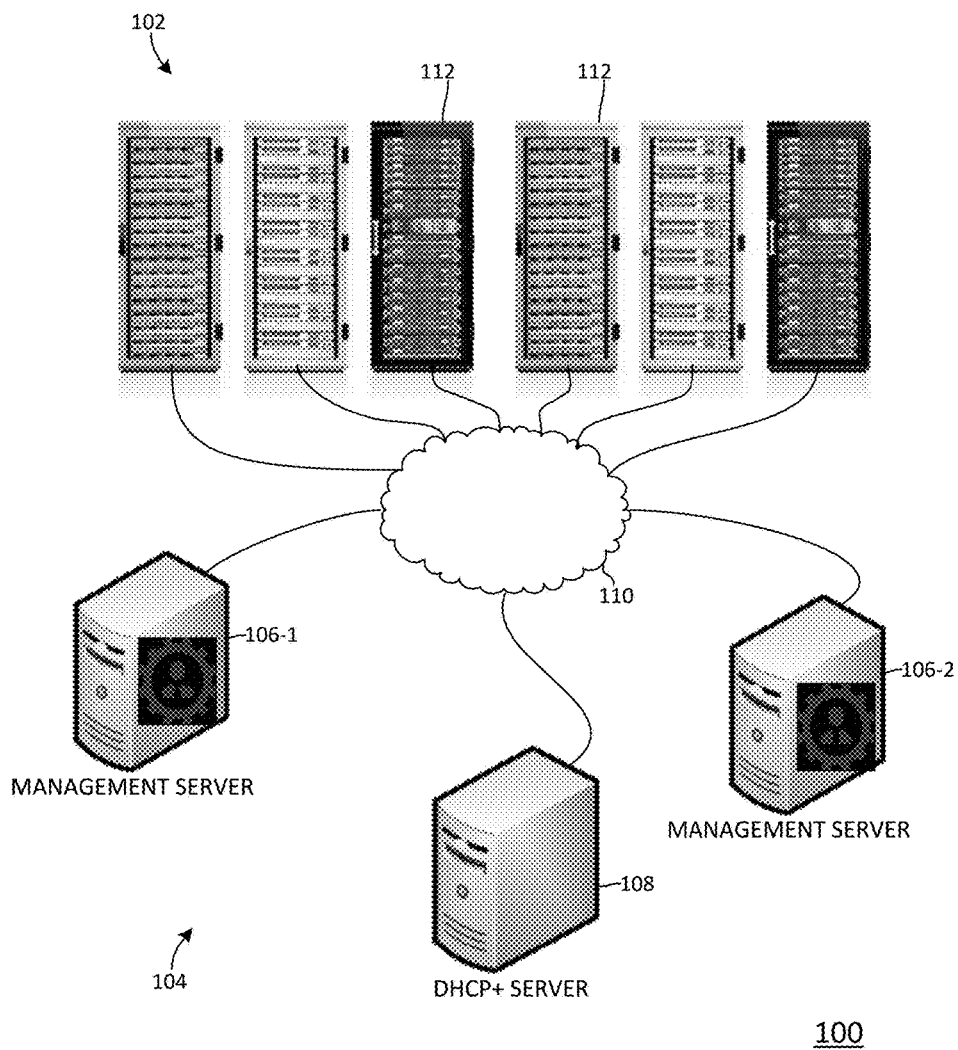
FIG. 1 illustrates a managed network including data center infrastructure, management resources, and a DHCP server.

As used herein, DHCP refers to the Internet Engineering Task Force (IETF) recognized version of DHCP, which is currently set forth in IETF Request for Comments (RFC) 2131, *Dynamic Host Configuration Protocol*, as updated by: RFC 3396 (*Encoding Long Options in the Dynamic Host Configuration Protocol (DHCPv4)*) RFC 4361, *Node-specific Client Identifiers for Dynamic Host Configuration Protocol Version Four (DHCPv4)*, RFC 5494, *IANA Allocation Guidelines for the Address Resolution Protocol (ARP)*, and RFC 6842, *Client Identifier Option in DHCP Server Replies*. Closely related to DHCP is RFC 2132, *DHCP Options and BOOTP Vendor Extensions*, as updated by RFCs Referring to the drawings, FIG. 1 illustrates a managed network 100 suitable for supporting a DHCP extension that facilitates automated discovery of information handling resources added to a data center or any other suitable assembly of managed resources. Because the managed network 100 illustrated in FIG. 1 is representative of a data center, the managed network 100 illustrated in FIG. 1 may be referred to herein as data center 100.

The data center 100 depicted in FIG. 1 includes managed infrastructure 102 coupled to management and configuration resources 104 via a network 110. Network 110 may include one or more public or private, IP-based local area or wide area networks, including one or more Ethernet-compliant networks. The management and configuration resources 104 illustrated in FIG. 1 include management servers 106-1 and 106-2 and a server 108 referred to herein as DHCP+ server 108.

Managed infrastructure 102 encompasses a wide variety of information handling resources including, as common examples, rack mount servers, modular chassis enclosures that receive one or more chassis modules, storage enclosures, network switching devices, and the like, all of which may be installed in any of a plurality of racks within any of a plurality of a rack cabinets 112. Although FIG. 1 illustrates a data center 100 comprising a plurality of rack cabinets 112 and a plurality of rack-mount information handling resources, the suitability of disclosed DHCP+ features encompasses substantially any managed group of information handling resources that implements DHCP.

Although FIG. 1 illustrates physical instances of managed infrastructure 102, management and configuration resources 104, and network 110, data center 100 encompasses analogous virtualized information handling resources, whether implemented on premises or in a public or private cloud.

Figure 2:
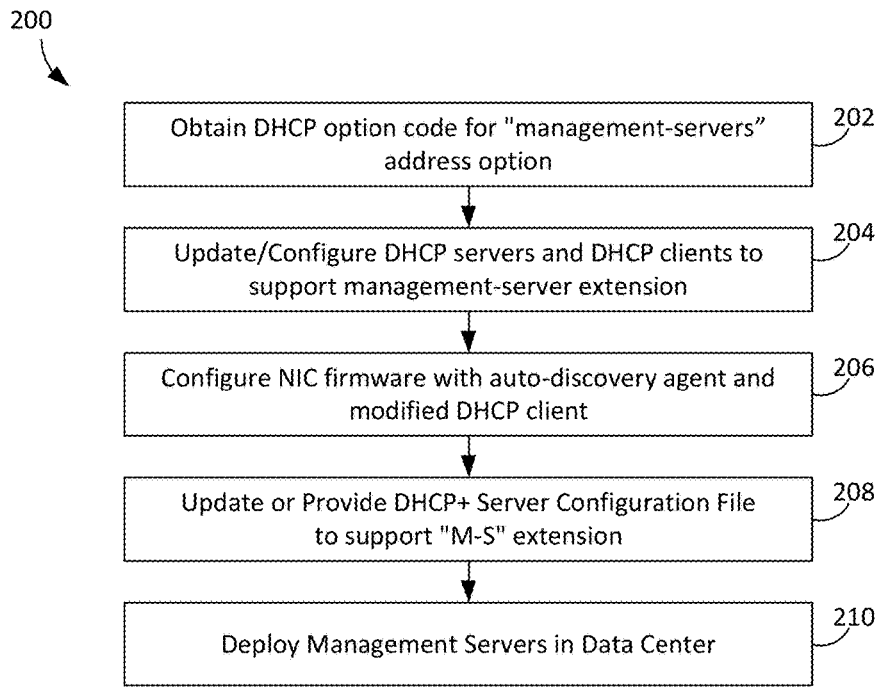
FIG. 2 illustrates a method of configuring a data center to support a DHCP extension enabling auto discovery of newly added information handling resources.

FIG. 2 illustrates a method 200 for configuring a data center, such as data center 100 (FIG. 1), to support automated discovery of information handling resources added to the managed infrastructure 102. In at least one embodiment, auto discovery features employ a DHCP extension described below. In any such embodiment, servers and other information handling resources of data center 100 may be described herein as being DHCP+ compliant and/or as supporting DHCP+. To configure data center 100 for DHCP+ support in accordance with disclosed subject matter, method 200 includes an initial operation of obtaining (operation 202) a designator or option code corresponding to the protocol extension from the Internet Assigned Numbers Authority (IANA), which is a division within the Internet Corporation for Assigned Numbers and Names (ICANN).

A DHCP extension described herein as a component or feature of DHCP+ is referred to as a management server extension. An identifier for the management server extension may be obtained from IANA by submitting a request for an option code designation. The request may include a request to reserve a particular value as the option code for a particular extension. For the sake of clarity, this disclosure assumes that the value 179 has been assigned by IANA as the option code for the management server extension described herein. It will be appreciated, however, that the actual value of the option code is an implementation detail.

After securing an option code for the management server extension, information handling resources of data center 100 that implement either a DHCP client or a DHCP server may be updated or otherwise configured (operation 204) to include DHCP+ support, i.e., support a version of DHCP that includes the management server extension described herein. At a minimum, such support would include a recognition of a management server option code included in a DHCP message. In addition, DHCP clients with management server extension support may be configured to obtain the IP addresses, or other addressable or identifying information, for each management server within the data center or within the applicable domain or subnet by including the management server option code in a DHCP message. In addition, DHCP+ compliant clients, also referred to herein as management server aware DHCP clients, may be further configured to store management server information received from a DHCP+ client to a designated storage resource of the DHCP+ client.

DHCP+ servers, i.e., servers that include support for the management server extension, may be configured to detect the management server option code included in a DHCP message from a DHCP+ client and to respond by including information identifying one or more management servers in a DHCP+ Offer or other message generated by the DHCP+ server. In addition, such DHCP+ servers may be configured to respond by obtaining information identifying each management server 106 within data center 100 and then forwarding this information.

In at least one embodiment, the management server extension enables DHCP+ clients to request address information for each management server 106 implemented within managed infrastructure 102. A DHCP+ client may obtain management server address information by including the management server option code in a DHCP+ discover and/or DHCP+ request. The DHCP+ offer and/or other reply generated by a DHCP+ server may include one or more DHCP+ packets that include a management server extension. Details of an example DHCP+ extension format are described below with respect to FIG. 3.

Returning to FIG. 2, the method 200 for configuring data center 100 for DHCP+ includes configuring (operation 206) NIC firmware with an auto discovery agent and a DHCP+ client. Method 200 may further include updating/providing (operation 208) a DHCP+ server configuration file. Once the DHCP clients, servers, and network interface cards have been configured as described above, one or more management servers may be deployed (operation 210).

Figure 3:
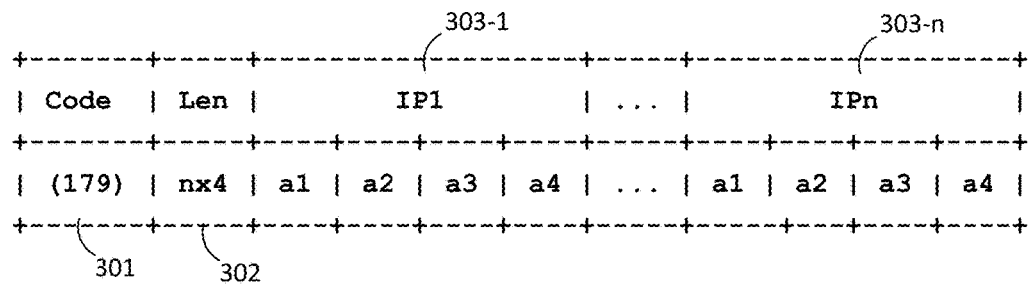
FIG. 3 illustrates an example format for a DHCP extension in accordance with disclosed subject matter.

FIG. 3 illustrates an example format for a management server extension 300. The management server extension 300 illustrated in FIG. 3 is arranged as a sequence of 8-bit bytes including an option code byte 301, which stores the IANA-assigned value for the management server option, a length byte 302, and one or more 4-byte IP address fields 303 where each IP address field 303 contains an IP address of a corresponding management server in data center 100. Because each IP address requires four bytes, the value stored in length byte 302 is equal to 4×N wherein N is the number of management servers. Although FIG. 3 illustrates a particular format for a management server extension, other formats capable of conveying analogous information may be employed instead.

Figures 4, 5:
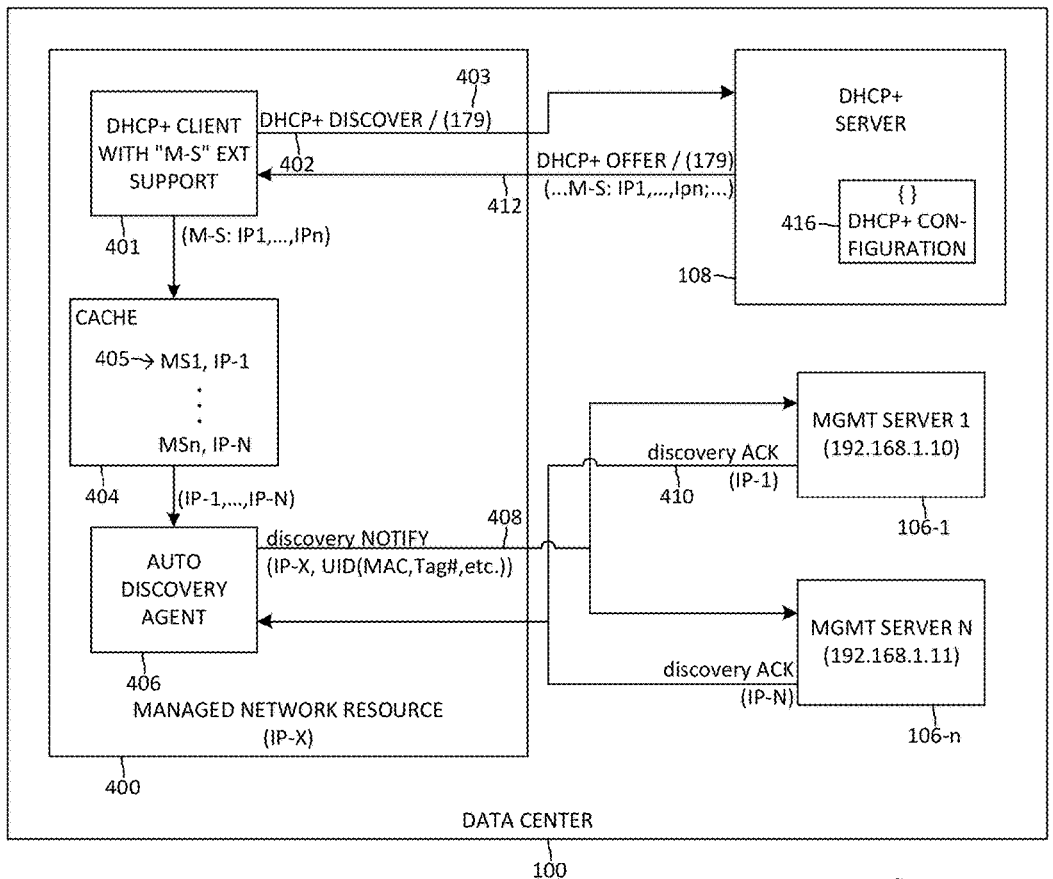
FIG. 4 illustrates information handling resources for use in conjunction with a DHCP extension enabling auto discovery of information handling resources newly added to method.
FIG. 5 illustrates an example DHCP configuration file for use in with the information handling resources of FIG. 4.

FIG. 4 illustrates elements of a data center 100 that supports DHCP+ functionality described herein. The elements of data center 100 illustrated in FIG. 4 include the management servers 106-1 and 106-2 and a DHCP+ server 108 consistent with the data center 100 illustrated in FIG. 1.

The data center 100 illustrated in FIG. 4 further includes an information handling resource referred to herein as managed network resource 400. The managed network resource 400 illustrated in FIG. 4 includes a DHCP+ client 401, a storage resource referred to herein simply as cache 404, and an automatic discovery agent referred to herein simply as discovery agent 406.

DHCP+ client 401 is illustrated coupled to cache 404 for storing received management server IP addresses 405. DHCP+ client 401 may obtain the IP addresses of management servers 106 by including a management server option code, e.g., option code 179, in a DHCP+ DISCOVER message 402 that is received by a DHCP+ server such as the DHCP+ server 108 illustrated in FIG. 4, which may return a list of management server IP addresses in a DHCP OFFER message represented in FIG. 4 by DHCP+ OFFER 412.

The discovery agent 406 illustrated in FIG. 4 is configured to send discovery NOTIFY messages 408 to management servers 106 and receive discovery acknowledgement (ACK) messages 410 from management servers 106. Discovery agent 406 may act as both client and server, communicating via UDP or another suitable protocol. As a client, discovery agent 406 may send discovery NOTIFY messages 408 to management servers 106 listed by DHCP+ OFFER message 412. As a server, discovery agent 406 may listen for discovery ACK messages 410 from management servers 106.

Upon completing a DHCP process, discovery agent 406 may retrieve the list of management server IP addresses 405 stored in cache 404 and send a discovery NOTIFY message 408 to each IP address included in the management server list. Discovery agent 406 may repeat this process periodically or otherwise until discovery ACK messages 410 have been received from all management servers 106. For example if discovery ACK message 410 contains IP address 192.168.1.10, then managed network resource 400 will cease sending discovery NOTIFY messages 408 to management server 106-1, i.e., the management server associated with IP address 192.168.1.10 until next boot/reboot.

The discovery NOTIFY messages 408 may comprise or include an auto discovery request uniquely identifying managed network resource 400, e.g., via an IP address, MAC address, Service Tag, device serial number, or the like. Management servers 106 may respond to discovery NOTIFY messages 408 by returning discovery ACK messages 410 to the managed network resource identified in the discovery NOTIFY message 408. Each management server 106 may include its IP address and/or other identifier into the discovery ACK.

The DHCP+ server 108 illustrated in FIG. 4 is configured to recognize and support management server extensions described herein. To support management server extensions, DHCP+ server 108 may include or otherwise have access to a DHCP+ configuration file 416.

In at least one embodiment, DHCP+ configuration file 416 may include information identifying or otherwise indicating one or more management servers 106. In at least one embodiment, discovery agent 406 can be disabled in firmware via BIOS settings if the user does not want to auto discover agents.

FIG. 5 illustrates an example DHCP+ configuration file 416. For at least some DHCP extensions and/or options that DHCP+ server 108 may support, DHCP+ configuration file 416 may include attribute-value information pertaining to the corresponding extension or option. With respect to the management server extension of DHCP described herein, DHCP+ configuration file 416 includes management server information 502 that includes a management server list 504. The management server list 504 includes information identifying one or more of the applicable management servers. As illustrated in FIG. 5, for example, each management server 106 (see FIG. 4) is identified by its IP address 506. Thus, for the data center 100 depicted in FIG. 4, which includes two management servers, 106-1 and 106-2, the management server list 504 illustrated in FIG. 5 includes two management server IP addresses, 506-1 and 506-2. In the case of FIG. 5, the management servers indicated by management server list 504 correspond to the management servers 106 included within data center 100.

Returning to FIG. 4, when managed network resource 400 is plugged into data center 100 or another management network, DHCP+ client 401 broadcasts a DHCP+ DISCOVER message 402 that may indicate one or more particular DHCP-recognized option codes. The DHCP+ DISCOVER message 402 of FIG. 4 includes, as one of the DHCP-recognized option code, a management server option code 403 having the value 179 in the illustrated example.

Figure 6A:
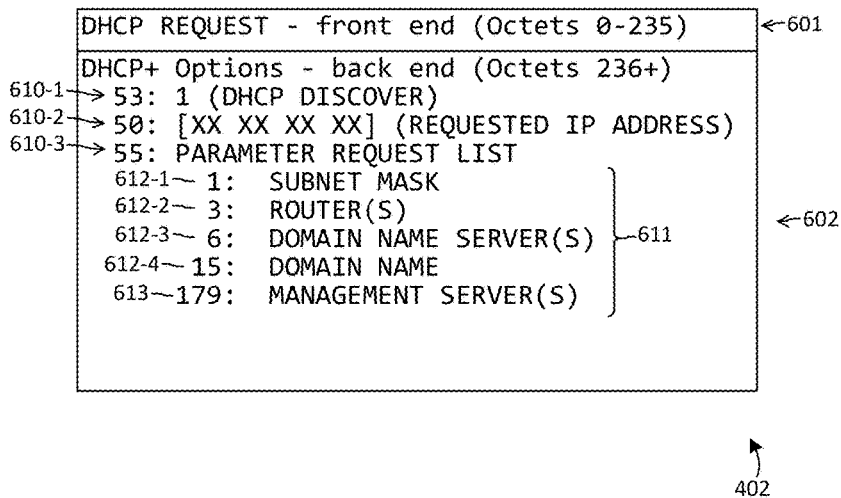
FIG. 6A illustrates a DHCP+ REQUEST in accordance with disclosed subject matter.

Referring to FIG. 6A, a representative format for DHCP+ DISCOVER message 402 is illustrated. The DHCP+ DISCOVER message 402 illustrated in FIG. 6A includes a DHCP "front end" 601 for a DHCP REQUEST operation/command such as a DHCP DISCOVER. FIG. 7 depicts a DHCP front end 601 in greater detail. As illustrated in FIG. 7, DHCP front end 601 comprises the first 236 octets (octets 0-235) of DHCP+ DISCOVER message 402. In addition, it will be appreciated by those of ordinary skill in the field that, although DHCP+ DISCOVER message 402 includes one or more option codes that covered by standard DHCP, front end 601 is compliant with standard DHCP, i.e., front end 601 does not include any fields, formats, or values that require an extension of DHCP as set forth in RFCs 2131/2132. See, IETF, RFC 2131 & RFC 2132, both of which are incorporated by reference herein.

Returning to FIG. 6A, DHCP+ DISCOVER message backend 602 includes various option codes 610 including one or more Specifically, DHCP+ DISCOVER message backend 602 includes first option code 610-1 to indicate a DHCP DISCOVER (option code: 53,1), a second option code 610-2 for a requested IP address (option code: 50), and a third option code 610-3 (option code: 55) associated with a parameter request list 611 indicating various DHCP-standard parameters 612 of interest to DHCP+ client 401 the at least one DHCP+ parameter 613 associated with a non-standard DHCP parameter. Specifically, the DHCP+ DISCOVER message 402 illustrated in FIG. 6A includes a first standard parameter option code 612-1 for a subnet mask option (parameter value: 1), a second standard parameter option code 612-2 for a router (parameter value: 3) and so forth. In addition, however, the parameter request list 611 of DHCP+ REQUEST 402 includes a non-standard DHCP option code 613 for the management server parameter (parameter value: 179)

Returning to FIG. 4, when managed network resource 400 is plugged into data center 100 or another management network, DHCP+ client 401 broadcasts DHCP+ DISCOVER message 402 that may indicate one or more particular DHCP-recognized option codes. The DHCP+ DISCOVER message 402 of FIG. 4 includes, as one of its DHCP-recognized option code, a management server option code 403, having the value 179, in the illustrated example. In response to receiving a DHCP+ DISCOVER message 402, the DHCP+ server 108 sends a DHCP+ OFFER 412.

Figure 6B:
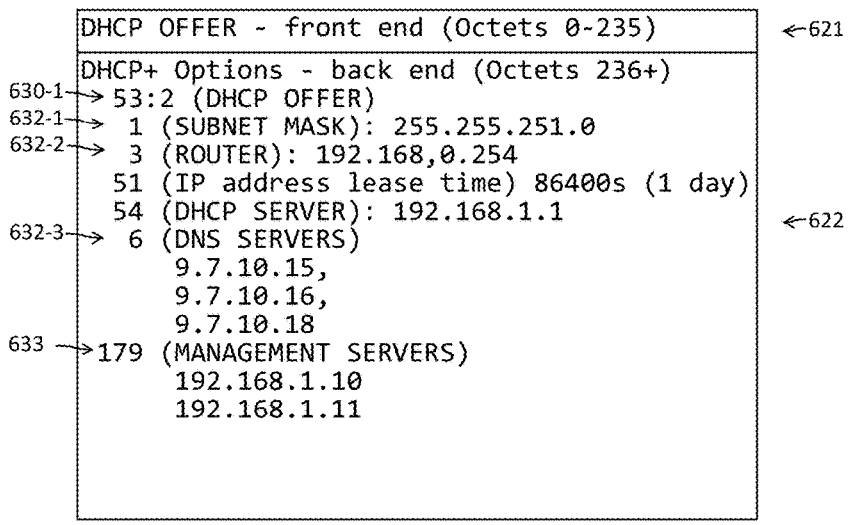
FIG. 6B illustrates a DHCP+ OFFER in accordance with disclosed subject matter.

Referring to FIG. 6B, a representative format for DHCP+ OFFER message 412 is illustrated. The DHCP+ OFFER message 412 illustrated in FIG. 6B includes a DHCP "front end" 621 for a DHCP REPLY operation/command such as a DHCP OFFER. DHCP front end 621 may have a format matching or substantially similar to the front end 601 of FIG. 6A and FIG. 7. The backend 622 of the illustrated DHCP+ OFFER message 412 includes first option code 630-1 to indicate that the DHCP message is a DHCP OFFER (option code: 53:2) and additional option codes corresponding to the parameters requested by DHCP+ client 401 in DHCP+ DISCOVER message 402. Specifically, DHCP+ OFFER message 412 includes standard DHCP option codes 632-1, 632-2, and 632-3 corresponding to standard DHCP parameters 612-1, 612-2 and 612-3 requested in DHCP+ DISCOVER message 402 (FIG. 6A). In addition, DHCP+ OFFER message 412 includes a management server option code 633 (option code: 179) corresponding to DHCP+ parameter 613 requested by the DHCP+ client 401 in the DHCP+ DISCOVER message 402.

Any one or more processes or methods described above, including processes and methods associated with any flow diagrams, may be embodied as a computer readable storage medium or, more simply, a computer readable medium including processor-executable program instructions, also referred to as program code or software, that, when executed by the processor, cause the processor to perform or otherwise results in the performance of the applicable operations.

A computer readable medium, which may also be referred to as computer readable memory or computer readable storage, encompasses volatile and non-volatile medium, memory, and storage, whether programmable or not, whether randomly accessible or not, and whether implemented in a semiconductor, ferro-magnetic, optical, organic, or other suitable medium. Information handling systems may include two or more different types of computer readable medium and, in such systems, program code may be stored, in whole or in part, in two or more different types of computer readable medium.

Unless indicated otherwise, operational elements of illustrated or described methods may be combined, performed simultaneously, or performed in a different order than illustrated or described. In this regard, use of the terms first, second, etc. does not necessarily denote any order, importance, or preference, but may instead merely distinguish two or more distinct elements.

Program code for effecting described operations may be written in any appropriate combination of programming languages and encompasses human readable program code including source code as well as machine readable code including object code. Program code may be executed by a general purpose processor, a special purpose processor, including, as non-limiting examples, a graphics processor, a service processor, or an embedded processor or controller.

Disclosed subject matter may be implemented in any appropriate combination of software, F/W, and hardware. Terms including circuit(s), chip(s), processor(s), device(s), computer(s), desktop(s), laptop(s), system(s), and network(s) suggest at least some hardware or structural element(s), but may encompass non-transient intangible elements including program instruction(s) and one or more data structures including one or more databases.

While the disclosure has been described with reference to exemplary embodiments, it will be understood by those skilled in the art that the disclosure encompasses various changes and equivalents substituted for elements. Therefore, the disclosure is not limited to the particular embodiments expressly disclosed, but encompasses all embodiments falling within the scope of the appended claims.

As used herein, the singular forms "a", "an" and "the" are intended to include the plural forms as well, unless the context clearly indicates otherwise. It will be further understood that the terms "comprises" and/or "comprising," when used in this specification indicates the presence of stated features, operations, elements, and/or components, but does not preclude the presence or addition of one or more other features, operations, elements, components, and/or groups thereof.

What is claimed is:

1. A discovery method, comprising:
   sending, by a dynamic host configuration protocol (DHCP) client of a managed network resource, a DHCP DISCOVER message to a DHCP server in the managed network, wherein the DHCP DISCOVER message includes an option code corresponding to a particular configuration parameter and wherein the particular configuration parameter comprises a management server parameter indicative of one or more management servers included in the managed network;
   receiving, from a DHCP server of the managed network, a DHCP OFFER message including management server information indicative of the one or more management servers included in the managed network; and
   sending, by the managed network resource, discovery NOTIFY messages to each of the one or more management servers wherein each discovery NOTIFY message identifies the managed network resource.

2. The method of claim 1, wherein the DHCP OFFER message indicates an IP address of each of the one or more management servers.

3. The method of claim 2, wherein the DHCP SERVER includes or obtains the IP addresses of each of the one or more management servers from one or more values of a management server attribute in a DHCP configuration file accessible to the DHCP server.

4. The method of claim 1, further comprising:
   storing the one or more IP addresses of the management servers in a cache of the DHCP client.

5. The method of claim 1, wherein each of the discovery NOTIFY messages includes an IP address of the managed network resource.

6. The method of claim 1, wherein each of the discovery NOTIFY messages includes an unique hardware identifier of the managed network resource.

7. The method claim 6, wherein the unique hardware identifier is selected from the group comprising: a media access control address, a serial number, and a tag number.

8. The method of claim 1, further comprising:
   monitoring for receipt of a discovery acknowledgement from each of the one or more management servers; and
   sending a subsequent discovery NOTIFY message to a management server; and
   mana message responsive to expiration of a particular response period interval monitoring for discovery acknowledgements received from messages.

9. The method of claim 1, further comprising:
   configuring the DHCP client and the DHCP server to associate the manager service parameter with a particular DHCP option code.

10. The method of claim 1, further comprising:
    obtaining from an Internet assigned number authority a designation of a particular DHCP option code as the management server option code value for the management server option code.

11. The method of claim 1, wherein sending DHCP DISCOVER message comprises automatically sending the DHCP DISCOVER automatically responsive to coupling the managed network resource to the managed network.

12. An information handling resource, comprising:
    a processor; and
    a network interface, including a dynamic host configuration protocol (DHCP) client, configured to perform operations comprising:
    sending, by the DHCP client, a DHCP DISCOVER message to a DHCP server in the managed network, wherein the DHCP DISCOVER message includes an option code corresponding to a particular configuration parameter and wherein the particular configuration parameter comprises a management server parameter indicative of one or more management servers included in the managed network;
    receiving, from a DHCP server of the managed network, a DHCP OFFER message including management server information indicative of the one or more management servers included in the managed network; and
    sending, by the managed network resource, discovery NOTIFY messages to each of the one or more management servers wherein each discovery NOTIFY message identifies the managed network resource.

13. The information handling resource of claim 12, wherein the DHCP OFFER message indicates an IP address of each of the one or more management servers.

14. The information handling resource of claim 13, wherein the DHCP SERVER includes or obtains the IP addresses of each of the one or more management servers from one or more values of a management server attribute in a DHCP configuration file accessible to the DHCP server.

15. The information handling resource of claim 12, further comprising:
   storing the one or more IP addresses of the management servers in a cache of the DHCP client.

16. The information handling resource of claim 12, wherein each of the discovery NOTIFY messages includes an IP address of the managed network resource.

17. The information handling resource of claim 12, wherein each of the discovery NOTIFY messages includes an unique hardware identifier of the managed network resource.

18. The information handling resource of claim 17, wherein the unique hardware identifier is selected from the group comprising: a media access control address, a serial number, and a tag number.

19. The information handling resource of claim 12, further comprising:
   monitoring for receipt of a discovery acknowledgement from each of the one or more management servers; and
   sending a subsequent discovery NOTIFY message to a management server; and
   mana message responsive to expiration of a particular response period interval monitoring for discovery acknowledgements received from messages.

20. The information handling resource of claim 12, further comprising:
   configuring the DHCP client and the DHCP server to associate the manager service parameter with a particular DHCP option code.

* * * * *